July 22, 1958 J. B. MASSEY 2,844,144
SURGICAL APPARATUS

Filed Aug. 12, 1955 3 Sheets-Sheet 1

INVENTOR
J. B. Massey
BY
ATTORNEYS

July 22, 1958    J. B. MASSEY    2,844,144
SURGICAL APPARATUS
Filed Aug. 12, 1955    3 Sheets-Sheet 2
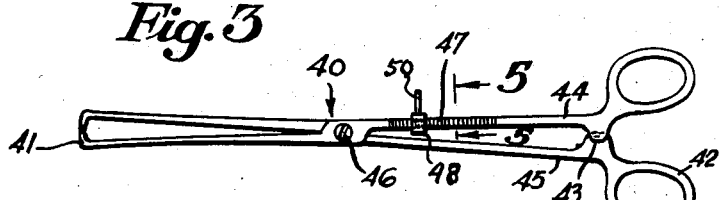
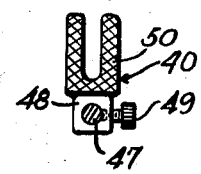
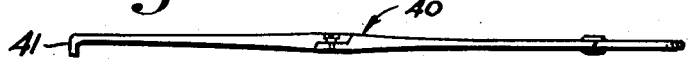
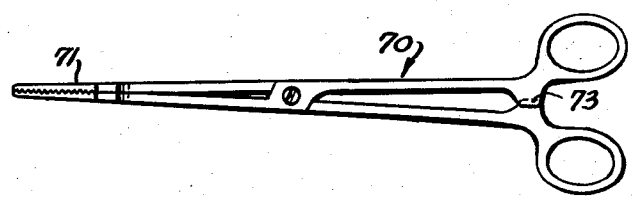
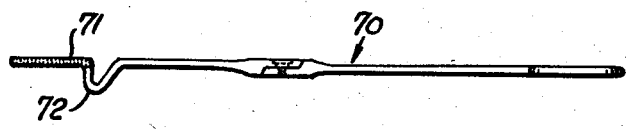
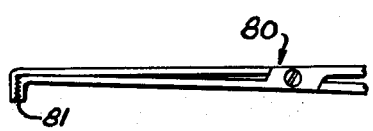
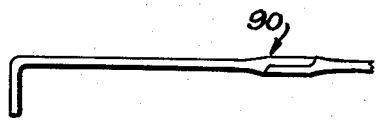
INVENTOR
J. B. Massey
BY
Richards & Geier
ATTORNEYS

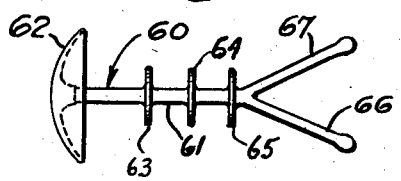
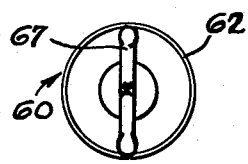
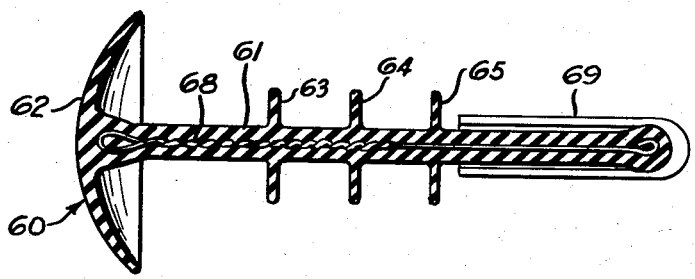
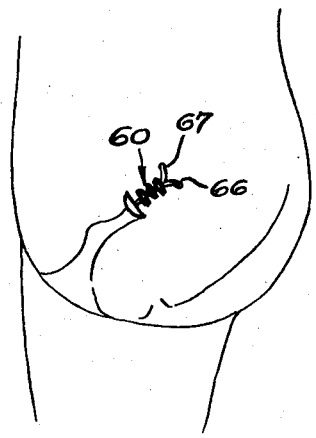

United States Patent Office 2,844,144
Patented July 22, 1958

2,844,144

SURGICAL APPARATUS

John Bruce Massey, Newark, N. J.

Application August 12, 1955, Serial No. 527,927

1 Claim. (Cl. 128—131)

This invention refers to a surgical apparatus and relates more particularly to an apparatus for the prevention of conception.

Birth control is often practiced through the use of a pessary inserted in the female cervix. The insertion of the pessary which must be carried out by a skilled surgeon, was found to be a most difficult, time consuming and painful operation.

Therefore, it is an object of the present invention to provide an apparatus through the use of which the operation of inserting a pessary can be carried out easily, effectively, quickly and without causing any pain to the patient.

A further object is the provision of a pessary which is so constructed that it will remain firmly and securely imbedded in the female organ, namely, cervix of uterus and serve as an effective protection against conception.

A still further object is the provision of an apparatus through the use of which the insertion of pessaries and other operations involving female genital organs, such as dilation of cervix and curettage, packing of uterus to stop bleeding or biopsy for diagnosis, can be carried out quickly and in a most efficient manner.

Other objects of the present invention will become apparent in the course of the following specification.

The objects of the present invention may be realized through the provision of an apparatus which involves essentially the combination of an improved speculum with an improved forceps connected with the speculum and used to insert a pessary of improved form.

The speculum of the present invention has a connecting plate which is connected to an adjustable connecting member mounted upon one of the legs of a clamping forceps. This forceps which is designated as a tenaculum clamp forceps, is used to clamp the top of the cervix while two other forceps are used to insert the pessary and to locate it properly within the cervix.

The pessary of the present invention has three fins which form outwardly directed cones during the insertion and is held in place by outwardly spread legs released by a capsule which melts as the result of body heat.

The invention will appear more clearly from the following detailed description when taken in connection with the accompanying drawings, showing by way of example a preferred embodiment of the inventive idea.

In the drawings:

Figure 1 is a side view illustrating the speculum with the two forceps extending there-through.

Figure 3 is a top view of the tenaculum clamp forceps.

Figure 4 is a side view of the forceps shown in Figure 3.

Figure 5 is a section along the line 5—5 of Figure 3, on an enlarged scale.

Figure 6 is a side view of the pessary of the present invention with the legs separated.

Figure 7 is an end view of the pessary shown in Figure 6.

Figure 8 is a section through the pessary with the legs held by a meltable cap.

Figure 9 is a top view of the floating pessary forceps.

Figure 10 is a side view of the forceps shown in Figure 9.

Figure 11 is a fragmentary top view illustrating the end portion of a perpendicular clamp forceps.

Figure 12 is a fragmentary top view illustrating a transverse clamp forceps.

Figure 13 illustrates the position of the inserted pessary within the human body.

Figure 1:
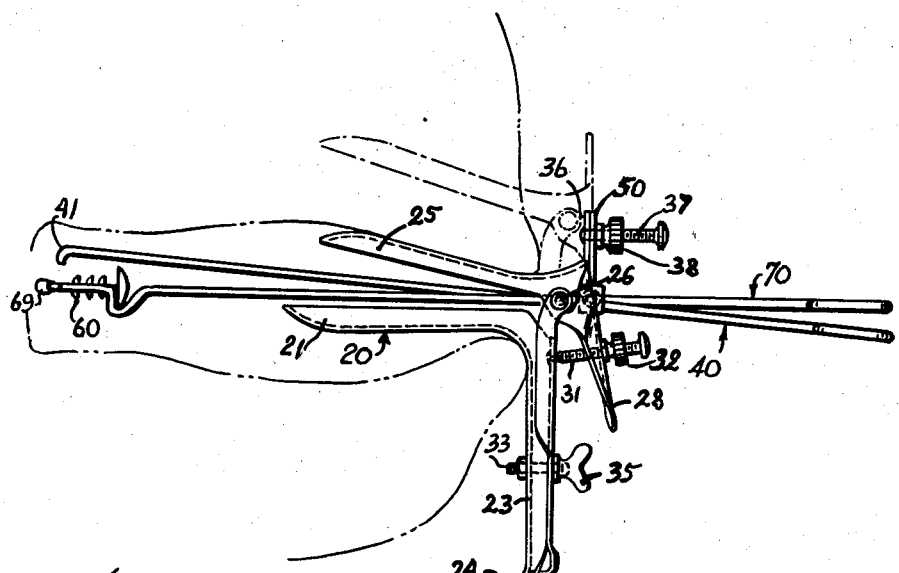
Figure 2:
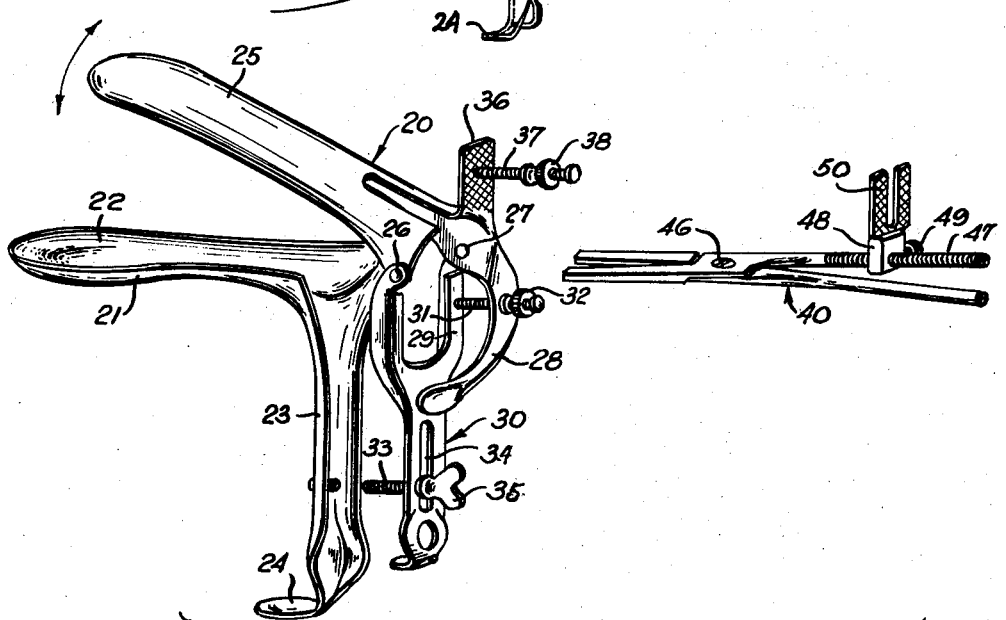
Figure 2 is an exploded perspective view showing the speculum with a part of the tenaculum clamp forceps.

The apparatus illustrated in the drawings includes a speculum 20 shown in Figures 1 and 2. The speculum includes a lower jaw 21 having an inner groove 22 and outer curved surfaces. The lower jaw 21 is integral with a downwardly extending member 23 which is also U-shaped in cross section. The member 23 ends in a perpendicular tongue 24. The upper jaw 25 is also provided with an inner groove and has two inner ends provided with pivots 26 and 27. The upper jaw 25 is integral with a curved handle portion 28. Pivots 26 and 27 are carried by a U-shaped portion 29 of a lower member 30.

A bolt 31 extends through an opening formed in the member 29 and is carried in the U-shaped portion 29 of the member 30.

The bolt 31 carries a knurled nut 32 which can be pressed against the handle portion 28. Due to this arrangement the jaws 21 and 25 can be maintained in any desired open position. The members 23 and 30 are interconnected by a bolt 33 which is fixed in the member 23 and extends through a slot 34 provided in the member 30. A winged nut 35 is carried by the bolt 33. Due to the provision of the groove 34, the relative distances between the jaws 21 and 25 can be varied within wide limits.

In accordance with the present invention, the upper jaw 25 is integral or firmly connected with a plate 36 having knurled surfaces and carrying a bolt 37 provided with the nut 38. The plate 36 is used for providing a firm connection between the speculum 20 and the tenaculum clamp forceps 40, shown in Figures 2, 3 and 4.

As shown in Figure 3, the forceps 40 has a tenaculum clamp 41 at one end and is provided at the other end with the usual handle portion 42 which may be held by the usual clamp 43. The forceps 40 has elongated portions 44 and 45 joined by a pivot 46.

In accordance with the present invention, the leg 44 of the forceps 40 has a grooved portion 47. A plate 48 moves upon the portion 47 and may be held in any position thereon by means of a set screw 49. The member 48 has a U-shaped knurled portion 50 which is adapted to embrace the bolt 37 carried by the speculum 20.

As indicated in Figure 2, the plate 50 may be engaged by the nut 38, so that a firm connection may be established between the speculum 20 and the forceps 40.

The present invention involves the use of a pessary 60, shown in Figures 6, 7, 8 and 13. As best shown in Figure 8, the pessary 60 is made of rubber latex or any other suitable material and includes a stem 61 carrying at one end a curved plate or cap 62. The stem 61 is connected with three plates or flanges 63, 64 and 65. Due to this provision of the three flanges, a secure anchoring of the pessary is provided.

The opposite end of the stem 61 has two legs 66 and 67. A wire 68 is located within the stem 61 and extends into the legs 66 and 67. The wire 68 is bent so that the legs 66 and 67 are normally spread apart, as shown in Figures 6 and 7. During the insertion of the pessary 60; the legs 66 and 67 are pressed together by means of a cap 69 fitting over the legs 66 and 67 and made of any suitable material, such as gelatine, which will melt within a predetermined time due to the heat of the human body.

The forceps used for the insertion of the pessary, which is generally known as the floating pessary forceps, is designated by the numeral 70 in Figures 1, 9 and 10, and has knurled or toothed ends 71. The forceps 70 has an intermediate V-shaped recess 72 which is adapted to receive the edge of the cap 62 of the pessary 60 during insertion.

As will be described hereinafter, the process of the present invention also contemplates the use of a perpendicular clamp forceps 80 shown in Figure 11, and a transverse clamp forceps 90 shown in Figure 12.

The operation of the described apparatus is as follows:

The speculum 20 is inserted in the vagina of the patient and the nut 32 is actuated to maintain the speculum in an open position, as illustrated in Figure 1. The cervix is sterilized and topical anaesthesia is administered. Then, the tenaculum clamp forcep 40 is introduced between the jaws 21 and 25 of the speculum 20 and the top of the cervix is clamped by the clamps 41 of the forceps 40. The sliding element 48 is adjusted upon the portion 47 of the forceps 40 and is fixed in position by means of the set screw 49. The plate 50 of the element 48 is firmly connected with the plate 36 of the speculum 20 by means of the nut 38. Due to this arrangement the forceps 40 remains in place and the surgeon is able to proceed conveniently with further operations.

Antiseptic is applied to the mouth of the cervix and it is slightly dilated with any forceps known in the art.

After lubrication of the cervix channel, the pessary 60 is clamped by the floating pessary forceps 70, Fig. 9. The ends of flanges 71 of the forceps 70 hold the stem 61 of the pessary while a part of the cap or button 62 fits into the recess 72 of the forceps 70, Figs. 8 and 10. The ends 66 and 67 of the pessary which at that time are covered by the capsule 69 extend forwardly. The pessary 60 is then introduced into the cervix, as illustrated in Figure 1.

Thereupon the perpendicular clamp forceps 80 (Fig. 11) is introduced and the clamps 81 are used to hold the cap or button 62 of the pessary 60. The clamps 71 of the forceps 70 are then released and the forceps 70 is gradually removed. Thereupon the surgeon uses the transverse clamp forceps 90 shown in Figure 12 to place the pessary 60 snugly in the cervix channel. It is apparent that during the insertion the three fins 63, 64 and 65 will form outwardly directed cones which will anchor the pessary firmly and prevent the seminal fluid from entering the uterus. Finally the forceps 80, the forceps 90 and the forceps 40 are removed in this order, an antiseptic is administered to punctured areas in cervix and the speculum 20 is closed and withdrawn.

After the pessary has been inserted for a while, usually about twenty minutes, the cap 69 melts as a result of body heat and the legs 66 and 67 of the pessary spread due to the action of the wire 68, as illustrated in Figure 13.

It is apparent that the described apparatus can be used most effectively for the insertion of the pessary 60 and that such insertion can be accomplished within the shortest possible time and with the minimum discomfort to the patient.

It is apparent that further variations and modifications may be made in the described apparatus within the scope of the appended claim.

What is claimed is:

In a surgical apparatus, a vaginal speculum comprising an upper jaw and a lower jaw, each of said jaws having curved outer surfaces and a leg portion extending perpendicularly to the jaw, means adjustably interconnecting the leg portions, means connected with said jaws for maintaining the upper jaw in an adjustable open position in relation to the lower jaw pivotal means securing said leg portions and said jaw portions, and an integrally formed forceps-connecting member connected with said upper jaw and comprising a plate-like support, and an adjustable screw carried by said support.

References Cited in the file of this patent

UNITED STATES PATENTS

| | | |
|---|---|---|
| 506,851 | Hatch | Oct. 17, 1893 |
| 726,704 | Kohlhaas | Apr. 28, 1903 |
| 2,482,622 | Kahn | Sept. 20, 1949 |
| 2,564,177 | Schmitt | Aug. 14, 1951 |
| 2,672,859 | Jones | Mar. 23, 1954 |